United States Patent [19]

Achelpohl et al.

[11] 4,176,000
[45] Nov. 27, 1979

[54] APPARATUS FOR MAKING CHAINS OF SACKS

[75] Inventors: Fritz Achelpohl; Horst Schneider, both of Lengerich of Westphalia, Fed. Rep. of Germany

[73] Assignee: Windmoller & Holscher, Lengerich of Westphalia, Fed. Rep. of Germany

[21] Appl. No.: 860,635

[22] Filed: Dec. 14, 1977

[30] Foreign Application Priority Data

Dec. 28, 1976 [DE] Fed. Rep. of Germany ....... 2659202

[51] Int. Cl.² .................... B32B 31/00; B30B 15/34
[52] U.S. Cl. .................... 156/510; 156/583.5
[58] Field of Search .................... 156/583, 510

[56] References Cited

U.S. PATENT DOCUMENTS

| 2,984,288 | 5/1961 | Gaubert | 156/583 |
| 3,122,467 | 2/1964 | Hannon | 156/583 |
| 3,140,218 | 7/1964 | Hannon | 156/583 |
| 3,300,365 | 1/1967 | Roos | 156/583 |

FOREIGN PATENT DOCUMENTS

| 943795 | 3/1974 | Canada . |
| 98056 | 6/1973 | German Democratic Rep. . |
| 1230299 | 1/1965 | Fed. Rep. of Germany . |
| 1740401 | 8/1967 | Fed. Rep. of Germany . |
| 2104082 | 1/1971 | Fed. Rep. of Germany . |
| 2263885 | 12/1972 | Fed. Rep. of Germany . |

Primary Examiner—Douglas J. Drummond
Attorney, Agent, or Firm—Fleit & Jacobson

[57] ABSTRACT

In welding apparatus for two layers of travelling plastics film, a plurality of welding tools is moved in pairs along an elongated welding station through which the film layers are passed. The welding tools located on both sides of the layers co-operate with one another and are mounted in tool holders carried by endless chains. The tool holders on one side of the film layers are constructed so that they can be temporarily uncoupled from the associated chain and instead coupled to the respective tool holders on the other side of the layers.

32 Claims, 9 Drawing Figures

APPARATUS FOR MAKING CHAINS OF SACKS

The invention relates to an apparatus for applying transverse weld seams to superposed webs of plastics film, preferably for the production of chains of sacks from semi-tubular plastics webs, comprising a plurality of welding tools which are guided in pairs along a planar processing path that is traversed by the webs, are guided on endless chains at both sides of the webs, act on each other, enclose the webs between each other, are disposed transversely of the webs and are arranged in tool holders.

Welding machines of this type with vertically disposed processing paths are known from DT-PS Nos. 2,104,082 and 2,263,885. Since the height of these machines is limited by the available space, only short periods are available for welding and cooling the seams, particularly in the case of high machine speeds, so that the resulting weld seams often fail to have the desired serviceability. The known machines are subject to intensive wear because near the start of the processing paths the tools are clamped to chains leading along the paths and at the end they are released from the chains and returned by carrier belts moving at a slower speed. By reason of the clamping forces and the high acceleration forces arising when the tools are coupled to the chains which lead them along the processing path, high stresses occur which then give rise to wear.

DL-PS No. 98,056 and DT-PS 1,230,299 disclose apparatuses of the aforementioned kind in which the welding tools are permanently fixed to the endless chains. In these apparatuses, one cannot avoid differences in the lengths of the chains occurring in the course of time, so that the co-operating welding tools will traverse the processing path at different speeds. This speed difference causes the welding tools to become displaced relatively to each other during the welding step, so that the strength of the weld seam is reduced, which is very disadvantageous, particularly in the case of thin films.

It is therefore a problem of the invention to avoid relative motion between the co-operating welding beams in a machine of the aforementioned kind.

This problem is solved according to the invention in that the tool holders on one side of the webs are constructed so that they can be uncoupled from their chain and coupled to the opposed tool holder. By releasing a tool holder from its chain and coupling it to the other tool portion, one achieves exact location of the upper and lower welding beams during the welding step, so that the tools are advanced independently of different length variations of the chains and the seams are formed transversely without relative displacement of the welding beams and thereby have their maximum strength.

Another disadvantage of the known apparatuses resides in the fact that the weld seams are subjected to the pressure exerted by the welding beams until the latter open at the end of the processing path, whereby the seams are inadequately cooled and in particular are prevented from shrinking during cooling. Durable shrunk seams can therefore not be produced with the known apparatuses. In a development of the invention that avoids these disadvantages, provision is therefore made for resiliently active clamping jaws to engage the webs at both sides of the welding beams of each of the co-operating tool portions. The web is first of all retained by the clamping means so that tensile forces acting on the seams in an unfavourable manner are absorbed and the web can cool off after welding in the absence of stress. By reason of the mobility of the welding beams relatively to the clamping means, the welding beams can be lifted off the seams at the end of the desired welding period, whereby the weld seams can cool off in the absence of pressure and their strength is further increased.

Advantageous embodiments of the invention are described in more detail in the subsidiary claims.

An example of the invention will now be described in more detail with reference to the drawing, wherein.

Figure 1:
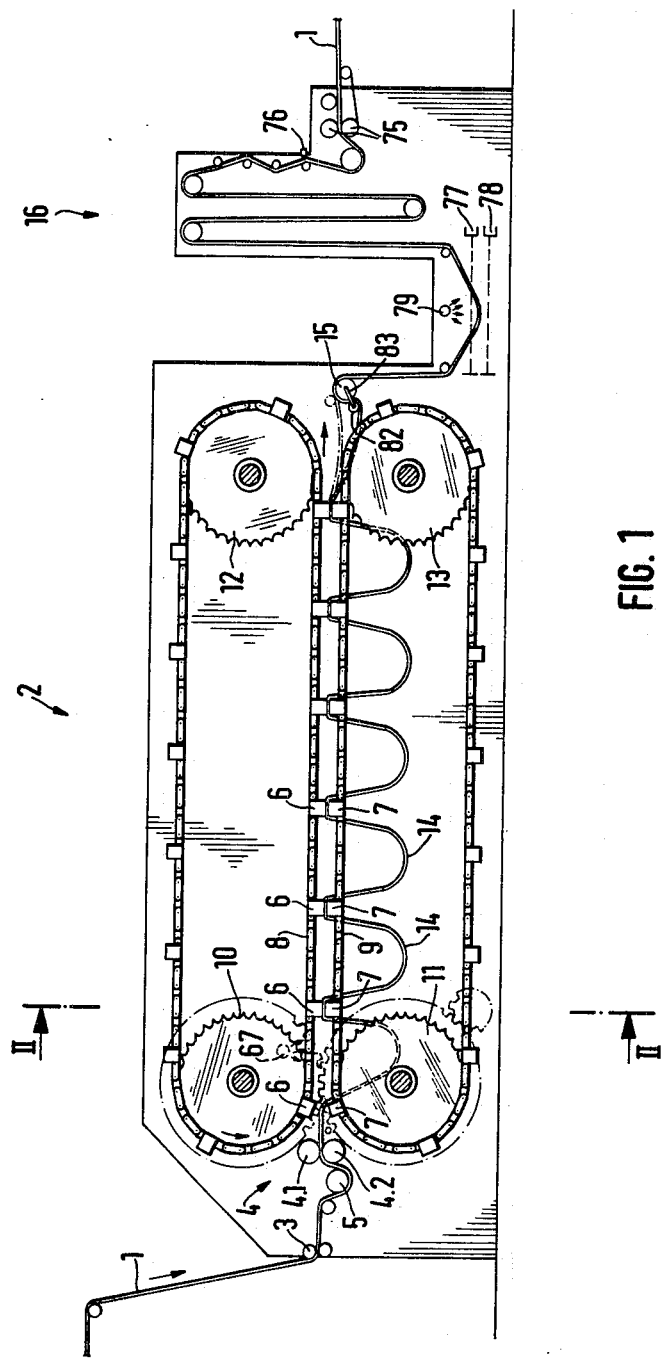
FIG. 1 is a side elevation of the welding apparatus.

A web 1 is taken off a supply reel in a known but unillustrated manner and fed to an apparatus 2 for making chains of sacks. Between the supply reel and apparatus 2, the web may traverse a printing press and there be printed. It can consist of a flattened tube, a one-sidedly open semi-tube or a flattened tube that has its upper layer longitudinally severed at the middle. The apparatus may also be charged with two one-sidedly open semi-tubes. It is fed to a pair 4 of tension rollers by way of a pair 3 of guide rollers. Upstream of the pair 4 of tension rollers there is a guide roller 5 which ensures that there is a large envelopment angle in the case of the lower tension roller 4.2. The web 1 then arrives between a pair 6, 7 of tools mounted on chains 8, 9 provided at both sides of the pair 6, 7 of tools. The chains 8, 9 run over sprockets 10 to 13. Tools pairs are arranged on the chains at equal spacings from one another. The pair 4 of tension rollers moves either faster than or at the same speed as the chains 8, 9. In the former case, the web 1 forms loops 14 between the individual pairs 6, 7 of tools as shown in FIG. 1 and in the latter case the web 1 passes through the apparatus 2 in a stretched condition. The pairs 6, 7 of tools comprise perforating and welding means with which the web 1 can be transversely welded and transversely perforated. At the sprockets 12, 13, the pairs 6, 7 of tools open again and release the web 1. It is taken off by a suction roller 15 which turns at the same speed as the web and, by way of a cooling path 16 along which the hot seams can cool off, it reaches an outlet (not shown) in which the finished chain of sacks is coiled and somehow or other processed further, for example packaged.

Figure 2:
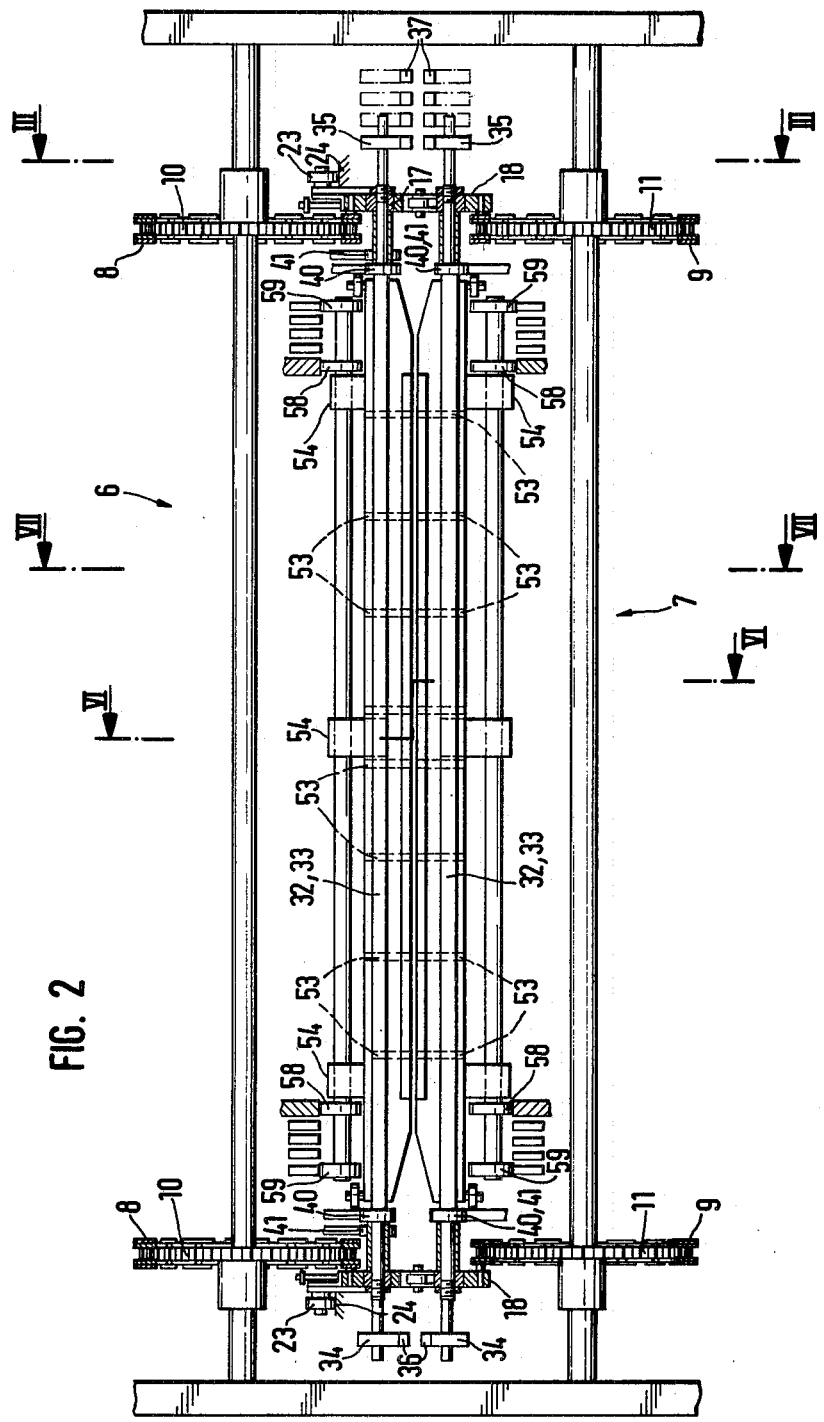
FIG. 2 is a section of the apparatus taken on the line II—II in FIG. 1.
Figure 3:
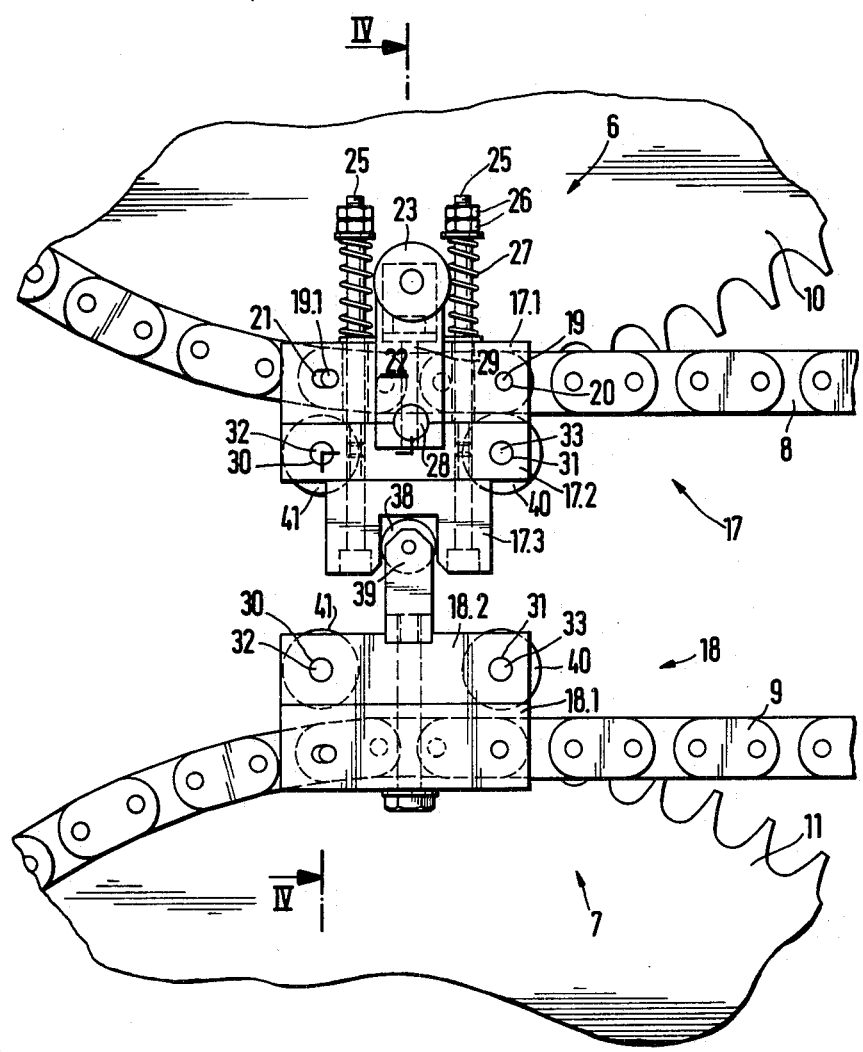
FIG. 3 is an enlarged section on the line III—III in FIG. 2.
Figure 4:
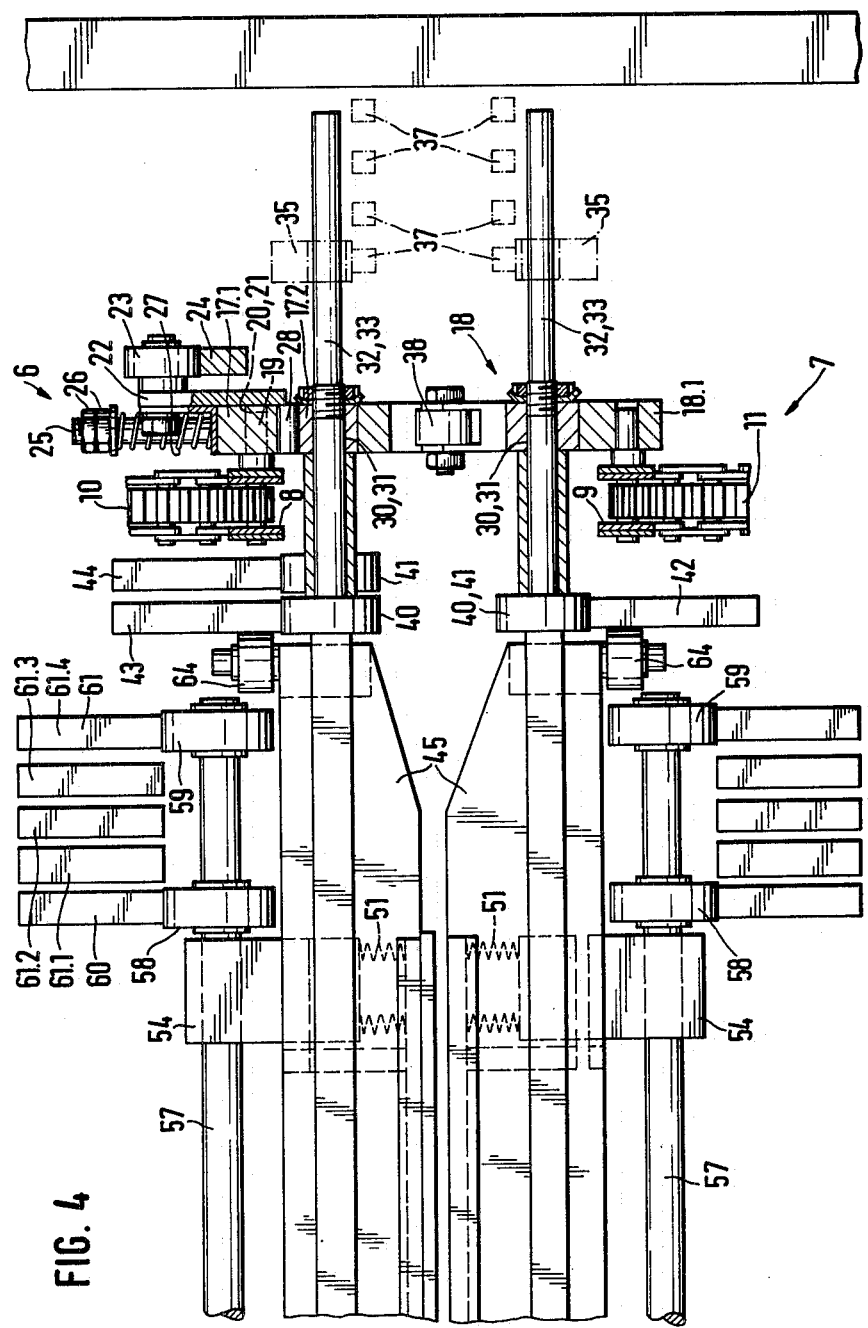
FIG. 4 is an enlarged representation of the right-hand side of FIG. 1 or a section on the line IV—IV in FIG. 3.

FIG. 2 shows a section through the apparatus 2. It shows an elevation of the pair 6, 7 of tools from the supply side of the web. At both sides of each pair 6, 7 of tools there are mounting plates 17, 18 which are made in two or three parts (FIG. 3). One part 17.1 is connected to a pin 19 projecting from a chain link, the pin being seated in a hole 20 of the part 17.1. A second pin 19.1 of the following chain link can move loosely in an elongated hole 21. Connected to the part 17.1 there is a lug 22 on which a roller 23 is loosely rotatable. The roller 23 runs on a bar 24 fixed with respect to the frame and prevents sagging of the part 17.1 or the chain 8.

A guide piece 17.2 which is part of the mounting plate 17 is connected to the part 17.1 by stay bolts 25 which pass, with play, through holes in part 17.1 and are screw-connected in the guide piece 17.2. End of bolts 25 project beyond the part 17.1, on which ends lock nuts 26 are screwed. Between these and the part 17.1 there are compression springs 27 by which the guide pieces 17.2 lie tightly against the parts 17.1. Both parts 17.1 and 17.2 have a common hole disposed centrally with respect to the dividing line and receives a bolt 28 which is screw-connected to the part 17.1 by a screw 29.

Screw-connected to the guide pieces 17.2 there are bifurcated parts 17.3 in the bifurcations of which there can engage rollers 38 which are secured to the mounting plates 18. The rollers 38 are loosely rotatably mounted in bearing heads 39 which are screw-connected to the parts 18.2 of the end plates 18. The parts 18.1 of the end plates 18 have holes and elongated holes in the same way as the parts 17.1 and in these there engage pins which project laterally from the chain and take the end plates 18 along with them. Rods 32, 33 which project outwardly at both sides beyond the plane of the sprockets are mounted in holes 30, 31 of the parts 17.2 and 18.2. The rods 32, 33 carry brush holders 34, 35 at their outer ends, the brushes of the brush holders 34 co-operating with neutral conductors 36 that are fixed with respect to the frame and the brush holders 35 being disposed on the right-hand side of the machine (the operating side) and their brushes being engaged on the positive conductor rails 37 that are fixed with respect to the frame. Altogether there are four positive conductor rails 37 for each tool 6, 7, a different rail for each successively arriving tool 6, 7. For this reason the brush holders 35 are staggered at a lateral spacing on the rods 32, 33 from one tool 6, 7 to the other, so that each first to fourth pair 6, 7 of tools is associated with different positive conductor rails. The fifth pair 6, 7 of tools that arrives will then again engage the positive conductor rail 37 with its brush, namely the rail just vacated by the brushes of the first pair 6, 7 of tools, in the same way as is described in DT-AS No. 1,704,401.

Loosely rotatably mounted on the rods 32, 33 at both ends of the pairs 6, 7 of tools there are rollers 40, 41 of which the rollers 40, 41 of the tools 7 roll along control rails 42 fixed with respect to the frame. The rollers 40, 41 of the tools 6 are laterally staggered. They roll along juxtaposed control rails 43, 44. The control rails 42 to 44 are provided with run-up inclines. The control rails 43, 44 are staggered in the longitudinal direction so that when the rollers 40, 41 pass they will simultaneously engage the control rails 43, 44. They are set somewhat lower than corresponding to the guiding provided by the chains 8. The guide pieces 17.2 are thereby lifted off and uncoupled from the parts 17.1 and made independent of the accuracy of the chains 8. The rollers 38 engage in the bifurcated parts 17.3 and couple the guide pieces 17.2 to the guide pieces 18.2 so that the guide pieces 18.2 take over the guiding function of the guide pieces 17.2 which are now no longer advanced by the chains 8 but by the chains 9. After leaving the control rails 43, 44, the guide pieces 17.2 are pulled up against the parts 17.1 and fixed in the longitudinal direction by the bolts 28. The rollers 38 will then no longer engage in the bifurcated part 17.3.

Lengthwise, the pairs 6, 7 of tools are secured against displacement by rollers 64 which roll laterally along the control rails 43, 44 which are fixed with respect to the frame and with which they have only little play.

Figure 6:
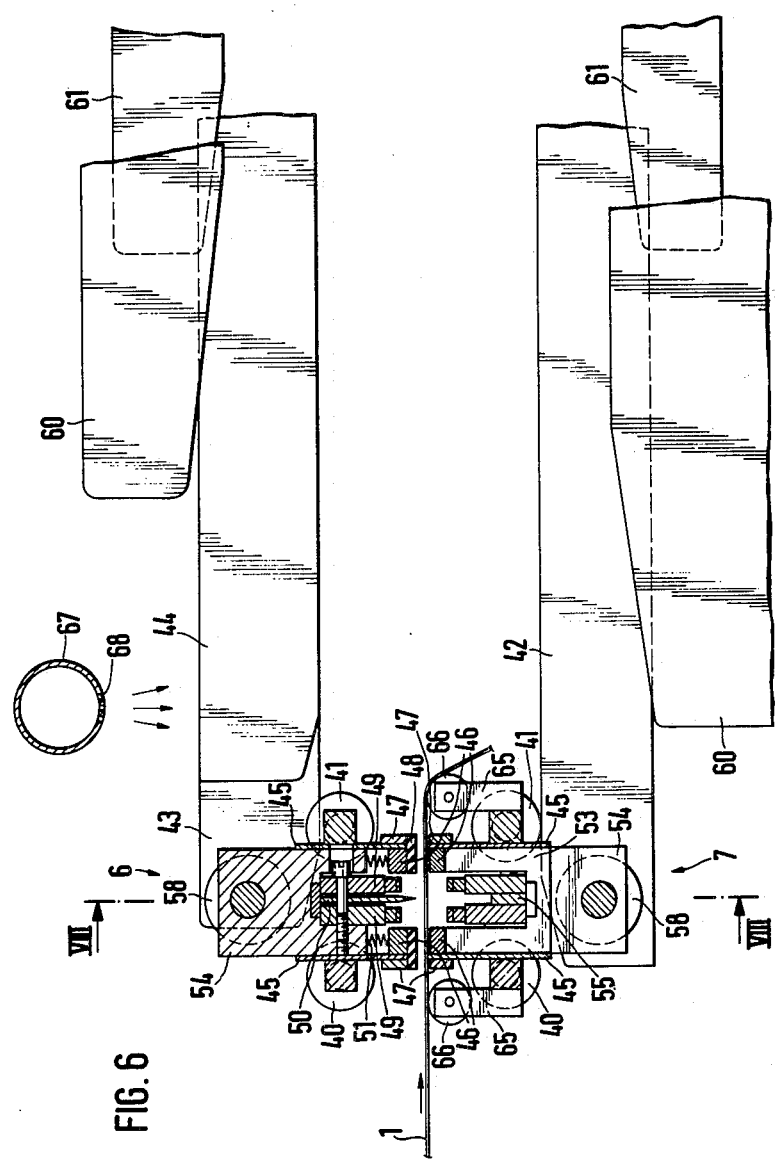
FIG. 6 is a section on the line VI—VI in FIG. 2 of a clamping, cutting and welding tool before running up onto the control cam.
Figure 9:
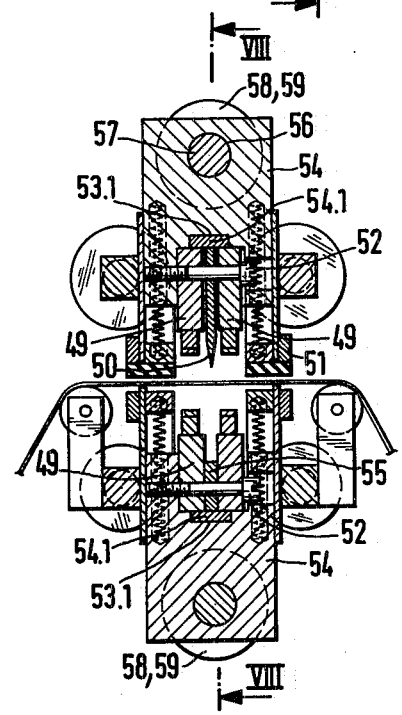
FIG. 9 is a section on the line IX—IX in FIG. 8.

Secured to the rods 32, 33 there are guide plates 45 (FIG. 6) on which supporting bars 46, 47 are mounted. The supporting faces of the supporting bars of the upper tool 6 are flush with the guide plates 45. A resilient rubber bar 48 is applied to them. The guide plates 45 of the lower tool 7 project upwardly beyond the supporting bars 46, 47. When the rollers 40, 41 run up on the control rails 43, 44 fixed with respect to the frame, the web 1 disposed between the pairs 6, 7 of tools is clamped in that the guide plates 45 of the lower tools 7 penetrate the rubber bars 48 of the upper tools 6 and the lower supporting bars 46, 47 lie against the rubber bars 48. The guide plates 45 are held at a spacing from one another by spacers 53 which are U-shaped in cross-section. Between the guide plates 45 of the upper tools 6, welding beams 49 and a perforating knife 50 are held in guide pieces 54 and displaceably guided relatively to the guide plates 45 which are supported against the supporting bars 46 by springs 51. The welding beams 49 and the perforating knife 50 are in accordance with FIG. 9 screw-connected to the guide pieces 54 by screws 52. The lower tool 7 is almost identical to the upper tool 6; only a spacer 55 is provided instead of the perforating knife 50. The guide pieces 54 are secured against falling out by abutment bars 54.1 which engage in complementary grooves 53.1 provided in the spacers 54 adjacent the guide pieces 54.

The guide pieces 54 have holes 56 in which roller bearing rods 57 are a tight fit, on the ends of which two rollers 58, 59 are secured at both sides of each tool 6, 7, the rollers 58 running along control rails 60 that are fixed with respect to the frame. The rollers 59 run along control bars 61 which are movable in the vertical direction and a number of which, in this case four, are juxtaposed. The rollers 59 are mounted on the roller bearing rods 57 at a lateral displacement to each successive tool 6, 7 so that the rollers 59 of the first pair 6, 7 of tools co-operate with the control bar 61.1, the second with the control bar 61.2 etc. and the rollers of the fifth pair 6, 7 of tools again co-operate with the control bar 61.1.

The control bars 60, 61 are staggered with respect to each other and have run-up inclines. When the rollers 58 run onto the control bars 60, the guide pieces 54 and thus the welding beams 49 as well as the perforating knife 50 in the case of the upper tool 6 are brought to the operative position, i.e. the web 1 held between the guide plates 45 and the rubber bar 48 is perforated by the perforating knife 50 and the welding beams 49 are placed on the web 1 from both sides. In order that the web 1 will be under tension during perforation and the points of the perforating knife can penetrate the web, the lower control bar 60 is provided with an elevated portion 60.2 along a section 60.1, whereby the lower yielding beams 49 are lifted. Behind the elevated portion 60.2 the lower welding beams 49 are returned to the elevation of the supporting bars so that the web 1 can be welded without stretching. After traversing a certain distance, the welding current is switched on and the web 1 is transversely welded. In the illustrated example, welding beams 49 are shown at both sides adjacent the perforating knife 50. One of these need not be connected to the source of welding current and thus it is possible to produce one or two transverse welds. After welding, the movable control bars 61 can be retracted out of the control plane by hydraulic cylinders 62 in the manner described in DT-PS No. 1,704,401. The control bars 61 are for this purpose pivotally connected to the frame by means of levers 63. Retraction of the control bars 61 causes the welding beams 49 to be lifted off the weld seams so that the weld seams cool off in the absence of stress and are able to shrink. Both welding beams 49 are, as already described, advanced only by the lower chains 9 during the welding step so that they cannot move relatively to one another in the direction of travel and thus ensure efficient welding.

Rollers 66 are loosely rotatable in roller mountings 65 secured to the lower rods 32, 33. The web 1 rolls over these rollers 66 and is fed to the pairs 6, 7 of tools by the feed rollers 4. To facilitate formation of the loops 14, a jet pipe 67 having downwardly directed jet orifices 68 is mounted at a position fixed with respect to the frame in the vicinity of the shaft of the sprockets 10 above the control rails 43, 44. By means of the air jets, the web 1 is pushed downwardly, thereby encouraging and enhancing formation of the loops.

Figure 7:
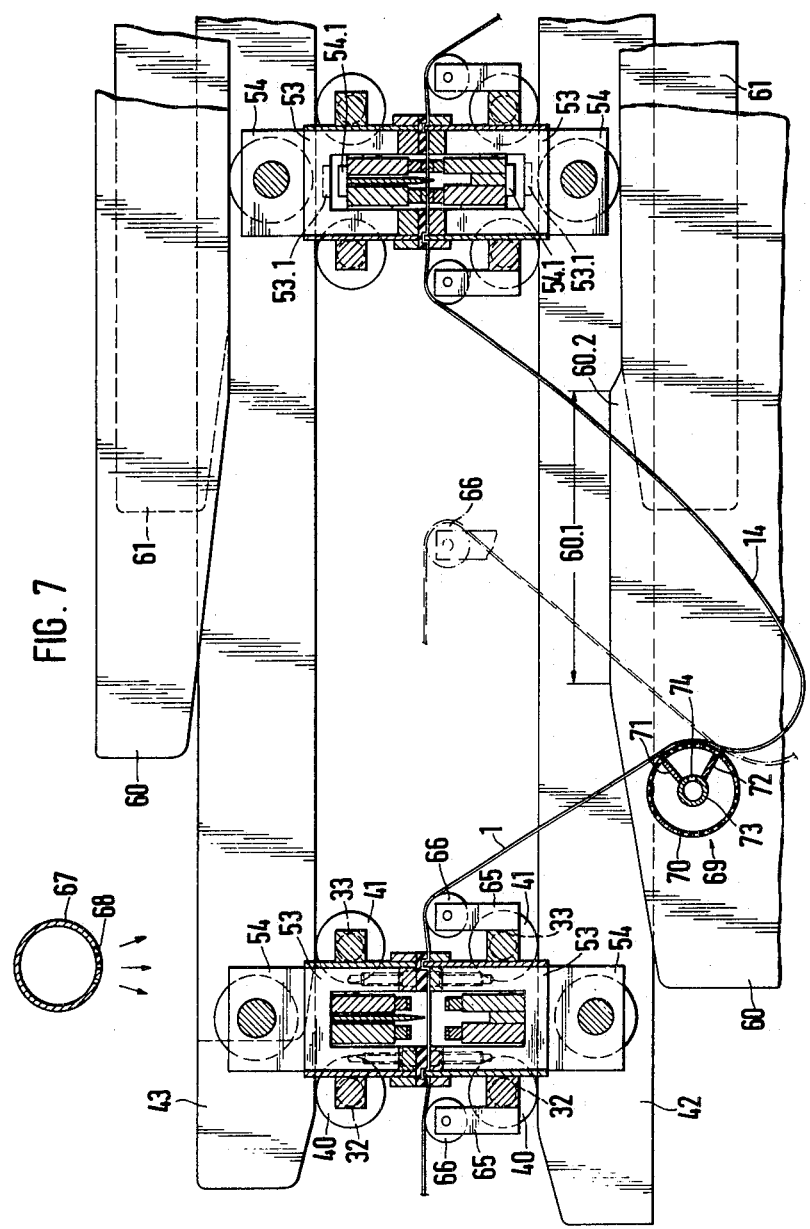
FIG 7 shows two clamping, welding and cutting tools sectioned on the line VII—VII in FIG. 2 after clamping the web of film.
Figure 8:
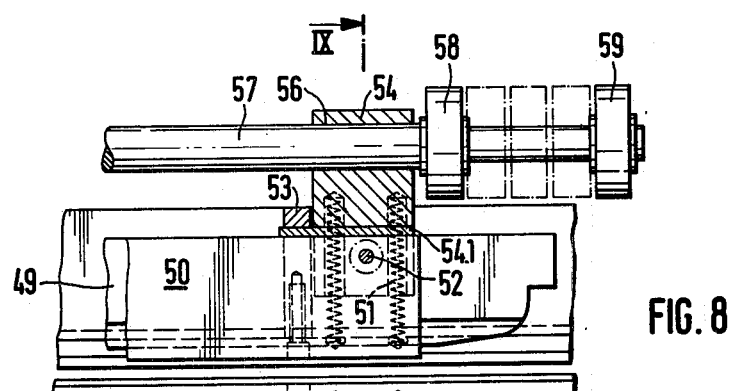
FIG. 8 is a section on the line VIII—VIII in FIG. 9.

The web 1 which already sags somewhat is engaged and taken off by a suction roller 69 which is disposed below the tools 7 and displaced somewhat in the direction of web travel with respect to the jet tube 67. The suction roller consists of a tube 70 which is perforated at the periphery, turns at a high speed and has its interior sub-divided by plates 71, 72 which are secured to a central tube 73 that is fixed with respect to the frame. The plates 71, 72 include an angle of about 80° with the web 1. Air is sucked off through holes 74 out of this space by way of the central tube 73. The suction effect terminates when the pair 6, 7 of tools has been advanced beyond the suction roller 69 and the roller 66 has reached the position shown in broken lines in FIG. 7, so that the web 1 makes contact with the suction-free peripheral portion of the suction roller 69 and be separated therefrom. By means of the suction roller 69 it is ensured that the loops will always be formed uniformly and thus the lengths of the sacks remain constant.

Figure 5:
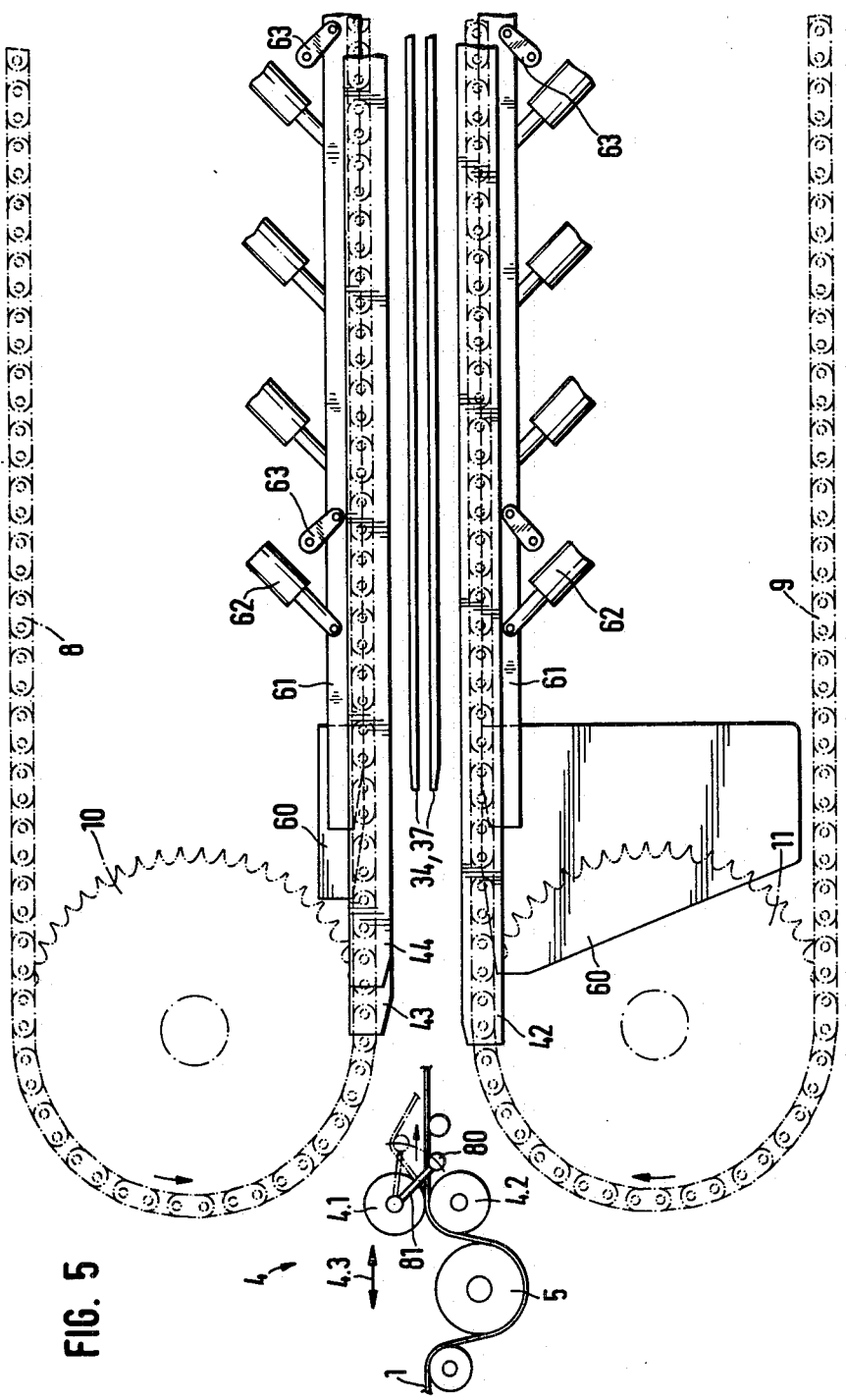
FIG. 5 is a diagrammatic side elevation of the inlet side of the apparatus with the mechanical control cams and electric conductor rails, particularly the tools being omitted.

Instead of or in addition to the suction roller 69, a beater rod 80 (FIG. 5) may also become effective to form identical loops 14. The clamping faces of the tools 6, 7 leave only a narrow gap for the passage of the web 1, particularly just before the clamping jaws close. This more or less brakes the web so that the loops 14 exhibit differences, albeit slight ones. These small length differences can be compensated by the beater rod 80. It extends over the entire width of the web and is connected at both sides to levers 81 which are rotatable about the shaft of the tension roller 4.1 and are driven by the main shaft of the machine. During operation of the machine, the beater rod 80 executes one to and fro oscillating motion between the positions shown in full and chain-dotted lines. This causes the web 1 to be pulled back by a slight amount just before it is clamped by the clamping faces of the respective tool 6, 7, whereby the loops are always formed uniformly. This slight retraction of the web 1 can also be achieved in that the pair 4 of tension rollers and the guide roller 5 are together mounted on a carriage (not shown) which can be cyclically displaced in the direction of the double arrow 4.3. Just before the clamping means of the tools 6, 7 are closed, the carriage is jerked back by a small amount and moved to its forward position during formation of the loops 14.

The aforementioned suction roller 15 (FIG. 1) is of the same construction as the suction roller 69. Its sucking surface extends over substantially the first quadrant. By continuously advancing the web 1, it takes up the web tension that would occur when the last pair 6, 7 of tools holding the web in FIG. 1 opens and the last loop 14 were suddenly to be pulled taut by the tension of the web portion disposed in the cooling path 16. This could cause one of the as yet warm weld seams to tear.

Advantageously, the suction roller 15 could also be given a rhythmically accelerated and a retarded peripheral speed in that it is driven by non-uniform gearing. It will then assume the lowest speed just before the clamping means of the tools 6, 7 open. This prevents the web from being stretched taut. Further, the suction air acting on the suction roller 15 may be rhythmically switched over to a strong and weak suction effect so that the web 1 or the chain of sacks can slip on the suction roller 15 if unusual tensile forces are exerted when pulling the web taut.

This stress compensation can also be achieved by a jockey roller 82 which extends over the width of the web 1 or chain of sacks and at the ends of which there are levers 83 of which the free ends are loosely rotatably mounted on the shaft of the suction roller 15. The jockey roller 82 assumes under its own weight substantially the position shown in FIG. 1. It is swung upwardly with increasing tension in the web 1. It prevents the web 1 from being flung upwardly on sudden tightening, which would considerably increase the danger of tearing.

The sense are further cooled along the cooling path 16. To ensure that the web 1 is not pulled over the respective guide rollers too tightly and does not sag too much, the appropriate take-off rollers 75 are controlled by a control which scans the web 1. This can consist of the perforation scanner which is known from DT-PS No. 2,124,413 and of which the sensor 76 can be disposed at the position indicated in FIG. 1. Alternatively, it consists of two reflection light barriers 77, 78 which are disposed beneath a cooling air jet tube 79 in the planes of the minimum and maximum sag and, on exceeding the limits given by these planes, appropriately influence the take-off rollers 75. The perforation scanner compares a given signal with the advance of the perforation of the chain of sacks and, by means of an electric circuit (not shown), controls the take-off speed of the take-off rollers 75 to be slower if the perforation signal arrives before the given signal and to be more rapid if the perforation signal arrives later.

We claim:
1. Apparatus for applying transfer weld seams to superposed webs of plastics film, preferably for the production of chains of sacks from semi-tubular plastics webs, comprising:
   a plurality of welding tools arranged in pairs;
   welding tool holder means for supporting each pair of welding tools;
   means for guiding said welding tool holder means so that said pairs of welding tools are guided along a planar processing path that is traversed by the webs, enclose the webs between each other, extend transversely of the webs, and act on each other to weld the webs, said means for guiding including pairs of upper and lower endless chains disposed on both sides of the webs, said welding tool holder means including pairs of upper and lower members carrying said welding tools, one of each of said pairs of upper and lower members being connected to and driven by its respective chains, the other of said pairs of upper and lower members being connected to its respective chains in such manner that said other members can be uncoupled and moved with respect to its chains into a position wherein said other member, while being connected to its chains, is coupled to and driven by the other chains.

2. Apparatus according to claim 1, wherein said welding tool holder means includes centreing supporting parts (17.1) for connecting said other members to their respective chains, and wherein, after said other members are coupled to their respective chains, they are loosely connected but relatively movable with respect to the chains.

3. Apparatus according to claim 2, wherein said welding tool holder means includes resilient means for acting on said other member and the supporting piece so that both are held in coupled engagement.

4. Apparatus according to claim 3, wherein said welding tool holder means includes guide pieces (17.2) connected to said other members, the supporting pieces (17.1) being secured to the guide pieces by stay bolts (25) passing, with play, through holes formed in the supporting pieces; and nuts (26) screwed on ends of the stay bolts extending out of the supporting pieces; said resilient means comprising springs (27) positioned between the nuts and the supporting pieces to hold the supporting pieces (17.1) and the guide pieces (17.2) together.

5. Apparatus according to claim 4, wherein the junction between the supporting piece (17.1) and the guide piece (17.2) is provided with a hole which is provided in the parting plane, a bolt (28) being disposed in the hole and secured to the supporting piece (17.1).

6. Apparatus according to claim 4, wherein said means for guiding includes two control rails (43, 44) fixed with respect to the processing path and offset with respect to each other in the longitudinal direction of the processing path, the guide pieces being provided with two rollers (40, 41) which travel on the control rails and which are offset in the direction of travel and laterally.

7. Apparatus according to claim 6, wherein said means for guiding includes sprockets (10) for guiding said upper chains, and wherein said apparatus further comprises a jet tube (67) disposed near said sprockets at a position fixed with respect to the conveying path and above the control rails (43, 44), the jet tube having downwardly directed jet orifices (68).

8. Apparatus according to claim 7, further comprising a suction roller (69) disposed beneath the welding tools and displaced towards the jet tube (67) in the direction of web travel, the suction roller having a tube (70) that rotates at high speed and is perforated at the periphery, the interior of the suction roller being sub-divided by plates (71, 72) secured to a central tube (73) that is fixed with respect to the conveying path.

9. Apparatus according to claim 8, wherein the plates (71, 72) include an angle of about 80° towards the webs of plastics film.

10. Apparatus according to claim 8, further comprising a second suction roller (15) which pulls the webs out of the welding tools after welding, said second suction roller is being constructed in the same way as the suction roller (69) and having a sucking surface extending substantially over the first quadrant.

11. Apparatus according to claim 8, further comprising a suction roller (15) positioned at the end of the processing path for continuously discharging webs.

12. Apparatus according to claim 11, further comprising clamping jaws for clamping webs being welded, and non-uniform gearing for driving the suction roller (15) in such manner that the lowest peripheral speed of said roller occurs just before opening of the clamping jaws.

13. Apparatus according to claim 11, further comprising means for periodically providing the suction roller (15) with stronger and weaker suction so that webs can slip thereon during tightening.

14. Apparatus according to claim 11, further comprising a jockey roller (82) positioned to rest on webs leaving the apparatus to prevent impacts in the webs that would produce stress peaks.

15. Apparatus according to claim 1 wherein one of said upper and lower members includes a bifurcated part, the other of said members including a roller engageable with the bifurcated part to couple the members to each other.

16. Apparatus according to claim 1 wherein said means for guiding includes control rails (42 to 44) positioned along the processing path and fixed with respect thereto, said welding tool holder means including guide pieces (17.2, 18.1) connected to ends of each of said upper and lower members, and rollers connected to said guide pieces, said rollers being positioned to ride on said control rails.

17. Apparatus according to claim 1, wherein each of the welding tools comprises spaced parallel welding bars, said apparatus further comprising a perforating knife disposed between and parallel to the welding bars of one welding tool.

18. Apparatus according to claim 1, wherein said means for guiding includes control rails (42, 43) fixed with respect to the processing path, said welding tool holder means including rollers (64) connected to the welding tools and engageable with the rails so as to provide lateral location of the tools.

19. Apparatus according to claim 1, wherein said welding tool holder means includes co-operating clamping jaws (48, 45) which resiliently clamp the web, said jaws being disposed on both sides of each of said pairs of welding tools.

20. Apparatus according to claim 19, wherein the other members of said upper and lower members include first guide pieces (17.2), first rods (32, 33) connected to the first guide pieces, first pairs of parallel guide plates (45) secured to the first rods and forming one of the clamping jaws, said one members of said upper and lower members including second guide pieces, second rods (32, 33) connected to the second guide pieces, second pairs of parallel guide plates (45) secured to the second rods and forming the other of the clamping jaws, said first and said second guide plates having pairs of supporting bars (46, 47), and rubber bars (48) positioned on the supporting bars of one of said first and said second guide plates, said rubber bars being engageable with the supporting bars of the other of said guide plates to clamp webs of film.

21. Apparatus according to claim 20, wherein guide pieces (54) are guided between said first and said second pairs of parallel guide plates, said welding tools comprising spaced-apart, parallel welding beams (49) screw connected to said guide pieces, said apparatus further comprising a perforating knife (50) positioned between one of said pairs of welding beams and a spacer (55) positioned between the other of said pairs of welding beams.

22. Apparatus according to claim 20, further comprising loosely rotatable rollers (66) over which the webs are passed positioned between the welding tools and secured to the rods (32, 33) carrying the guide plates (45).

23. Apparatus according to claim 1, wherein said means for guiding includes control bars (60, 61), first control bars (60) being fixed with respect to the processing path, hydraulic cylinders (62) for raising and lowering the other control bars, rollers (58, 59) movable on the control bars, and guide pieces (54) for loosely rotatably mounting the rollers.

24. Apparatus according to claim 23, wherein a number of the raisable and lowerable control bars (61) are juxtaposed and wherein, at the guide pieces (54), the rollers (59) rolling on these control bars (61) are staggered with respect to each other from one pair of tools to the next.

25. Apparatus according to claim 24, wherein the lower control bar (60) fixed with respect to the conveying path is provided with an elevation (60.2).

26. Apparatus according to claim 1, wherein said apparatus includes negative and positive conductor rails (36, 37) fixed with respect to the conveying path, a number of the positive conductor rails (37) being juxtaposed, and wherein said welding tool holding means includes brushes (34, 35) that cooperate with the conductor rails, the respective brushes cooperating with the positive conductor rails being staggered with respect to each other from one pair of welding tools to the next.

27. Apparatus according to claim 26, further comprising means for switching on welding current at a particular position during passage of the welding tools and for switching off the welding current after a predetermined period.

28. Apparatus according to claim 1, further comprising take-off rollers (75) for removing webs and a control (76 to 78) scanning the webs and controlling said take-off rollers.

29. Apparatus according to claim 28, wherein the control (76 to 78) comprises a perforation scanner.

30. Apparatus according to claim 28, wherein the control (76 to 78) comprises two reflection light barriers (72, 78) disposed in the planes of minimum and maximum sag of webs being removed.

31. Apparatus according to claim 1, further comprising a beater rod (80) positioned in the vincinity of the inlet to the processing path, pivot arms (81) for supporting the rod, which rod is provided with a drive for oscillating it to and fro in sequence with the operating cycle of the apparatus and which pulls the webs back through a small distance before clamping between the clamping jaws (45, 48).

32. Apparatus according to claim 1, further comprising tension roller pair (4) mounted on a reciprocatable carriage for pulling webs in a backward direction.

* * * * *